United States Patent [19]

Lechevalier

[11] Patent Number: 5,400,010

[45] Date of Patent: Mar. 21, 1995

[54] MALFUNCTION DETECTOR FOR AN OIL-FUEL HEAT EXCHANGER

[75] Inventor: Michel Lechevalier, Mormant, France

[73] Assignee: Societe Nationale d'Etude et de Construction de Moteurs d'Aviation (S.N.E.C.M.A.), Paris, France

[21] Appl. No.: 51,693

[22] Filed: Apr. 26, 1993

[30] Foreign Application Priority Data

Apr. 30, 1992 [FR] France .................... 92 05351

[51] Int. Cl.⁶ .................................. B60Q 1/00
[52] U.S. Cl. ...................... 340/450.3; 340/618; 73/290 R
[58] Field of Search ............ 73/290 R, 291, 301, 73/307, 308, 313, 304 R, 304 C; 340/450, 450.3, 603, 612, 618, 620

[56] References Cited

U.S. PATENT DOCUMENTS 4,163,391  8/1979  Bezard et al. .
4,721,941  1/1988  Robine et al. .................. 340/450.3

FOREIGN PATENT DOCUMENTS 2630543  10/1989  France .

OTHER PUBLICATIONS

Japanese Abstract (52-221122)—vol. 8, No, 75 (P-266) (1512) Apr. 7, 1984.

Primary Examiner—James J. Groody
Assistant Examiner—Nate Flynn
Attorney, Agent, or Firm—Bacon & Thomas

[57] ABSTRACT

A detector for detecting the level of oil in an oil reservoir is disclosed having particular application for use in a lubricating system of a gas turbine engine in order to determine a malfunction of an oil-fuel heat exchanger. The device uses an electrically actuated level sensor within the oil reservoir connected to a first electrical circuit having an outlet junction at which is applied a voltage $U_1$ which varies with the level of oil in the reservoir, and a second circuit having a second outlet junction at which is applied a voltage $U_2$ which decreases as the oil level decreases, but which does not increase as the oil level increases. A comparison circuit connected to the outlet junctions of the first and second circuits compares the difference between the voltages $U_1$ and $U_2$ to a predetermined reference voltage $U_0$ and, if the difference exceeds this reference voltage, provides an output signal to actuate a visual indicator.

6 Claims, 1 Drawing Sheet

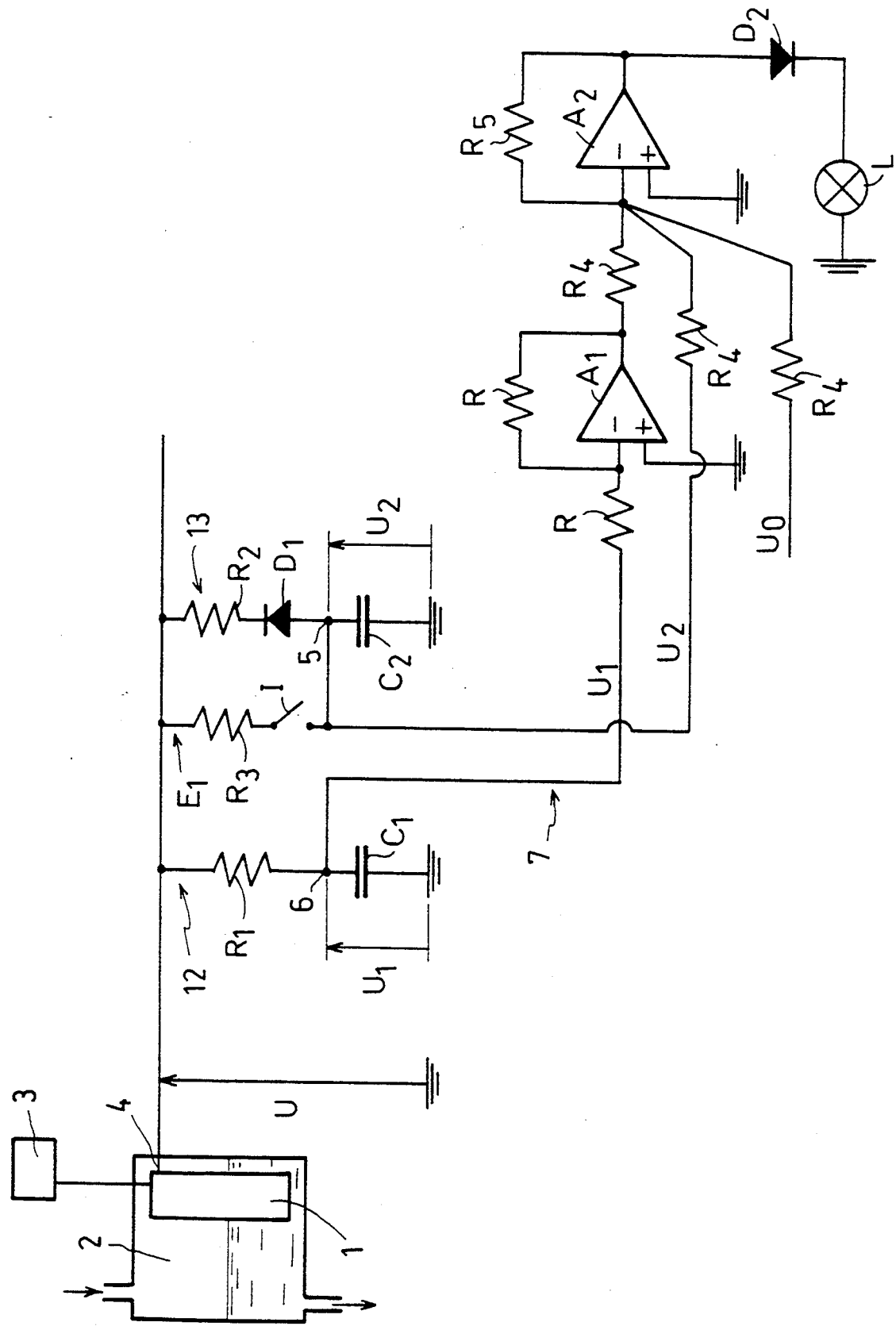

MALFUNCTION DETECTOR FOR AN OIL-FUEL HEAT EXCHANGER

BACKGROUND OF THE INVENTION

The present invention relates to a malfunction detector for an oil-fuel heat exchanger used in the lubrication circuit of an aircraft gas turbine engine.

Fire on board an aircraft represents a most critical occurrence, one which may easily result in catastrophe. A modem gas turbine aircraft engine requires the use of flammable materials, such as fuel and lubricating oil. It is imperative, therefore, to preclude leaks of these flammable materials, which may be occasioned by poor seals and degradation of mechanical parts in the fuel and lubricating systems in order to prevent such fluids from contacting high temperature parts of the gas turbine engine.

Most turbojet engines are equipped with an oil-fuel heat exchanger mounted in the lubrication circuit. When the heat exchanger fails, fuel and oil from the two fluid circuits may intermix which, in most cases, will involve the flow of fuel from the fuel circuit into the lubricating oil circuit due to the higher fuel pressure within the heat exchanger.

The intermixing of the fuel and oil circuits are manifestly undesirable. Dilution of the oil with the fuel substantially increases the danger of an internal engine fire, especially when the aircraft is on the ground after operation, since the labrynth seals of the aircraft engine may be diminished and the engine temperature is great enough to cause ignition of the fuel and the oil. Moreover, the fuel degrades the lubricating properties of the lubricating oil, which may further raise the temperature of the moving parts of the engine. The addition of the fuel to the lubricating circuit will cause the lubricating oil reservoir to overflow when the reservoir is at atmospheric pressure. If the reservoir is located within an enclosure, the pressure within the enclosure increases and the enclosure may be flooded.

U.S. Pat. No. 4,163,391 describes a device to monitor the level of the liquid in a reservoir using a high-temperature coefficient resistor whose resistance changes as a function of its temperature. This device compares several voltages and requires the use of a calibration and computation chart or graph, in particular to calculate the operating time of a delay system.

SUMMARY OF THE INVENTION

A detector for detecting the level of oil in an oil reservoir is disclosed having particular application for use in a lubricating system of a gas turbine engine in order to determine a malfunction of an oil-fuel heat exchanger. The device uses an electrically actuated level sensor within the oil reservoir, such sensor applying a voltage U to an outlet terminal. Connected to the outlet terminal of the sensor is a first electrical circuit having an outlet junction at which is applied a voltage $U_1$ which varies with the voltage U, and a second circuit having a second outlet junction at which is applied a voltage $U_2$ which decreases as the voltage U decreases, but which does not increase as voltage U increases. A comparison circuit connected to the outlet junctions of the first and second circuits compares the difference between the voltages $U_1$ and $U_2$ to a predetermined reference voltage $U_0$ and, if the difference exceeds this reference voltage, provides an output signal to actuate a visual indicator.

The failure of the fuel-oil heat exchanger will typically cause the level within the lubricating oil reservoir to increase. Thus, an increase between voltages $U_1$ and $U_2$ will indicate an increase in the level of the fluid in the reservoir. The predetermined reference voltage $U_0$ can be set at a level which can be exceeded only by fuel intermixing with the lubricating oil, thereby indicating a failure of the oil-fuel heat exchanger.

BRIEF DESCRIPTION OF THE DRAWINGS

The single FIGURE is a schematic diagram of the malfunction detector according to the present invention.

DETAILED DESCRIPTION OF THE PREFERRED EMBODIMENT

FIG. 1 is a schematic diagram of the detector according to the present invention which comprises an electrically actuated level sensor 1 located within the lubricating oil reservoir 2 of a gas turbine engine lubricating circuit (not otherwise shown). The level sensor 1 is electrically powered in known fashion by a current source 3. The level sensor 1 has an electrical outlet terminal 4 at which is applied a positive voltage U which varies in direct relationship to the level of the oil within the reservoir 2.

An electrical circuit 12 is connected between the outlet terminal 4 and ground, and comprises a resistor $R_1$ and a capacitor $C_1$ connected in series. Circuit 12 has an outlet junction 6 at which is applied a voltage $U_1$ and which is located between the resistor $R_1$ and the capacitor $C_1$.

A second electrical circuit 13 is also connected between outlet terminal 4 and ground in parallel with the first electrical circuit 12. Circuit 13 comprises a resistor $R_2$, a diode $D_1$ and a capacitor $C_2$ connected in series such that the diode $D_1$ is located between the resistor $R_2$ and the capacitor $C_2$. Circuit 13 also comprises a subassembly $E_1$ which consists of a resistor $R_3$ and a switch I connected between the outlet terminal 4 and the outlet junction 5. As can be seen, the outlet junction 5 is located between the capacitor $C_2$ and the diode $D_1$. The circuit 13 applies a voltage $U_2$ at the outlet junction 5.

The outlet junctions 5 and 6 are both connected to a malfunction detector 7 which comprises a first inverting operational amplifier $A_1$ with a gain of $-1$ and having the outlet junction 6 connected to its negative input terminal such that the output of the amplifier $A_1$ is a voltage $-U_1$. A second, adding amplifier $A_2$ has its negative input connected to the output of the amplifier $A_1$, along with the outlet junction 5 and means for generating a reference voltage $U_0$. As can be seen, both of the positive amplifier inputs are connected to ground. The output of the amplifier $A_2$ is connected to a diode $D_2$ which, in turn, is connected to a visual indicating device L, which may be a light bulb, or the like.

In operation, the switch I is dosed when the gas turbine engine is started. The voltage U is applied to the capacitors $C_1$ and $C_2$ such that $U = U_1 = U_2$. When the gas turbine engine has been started and is running, the switch I is opened. When the oil level drops in the reservoir 2, which will normally take place following engine start up due to the lubricating oil filling the lubricating circuit, the voltages U, $U_1$ and $U_2$ remain equal, but all decrease from their initial values. The capacitor $C_2$ is also discharging through the diode $D_1$.

In the event the level inside the reservoir 2 should increase, voltages U and $U_1$ will also increase in the same manner. However, voltage $U_2$ remains at its previous lower value because of the blocking action of the diode $D_1$. An increase in the fluid level within the reservoir 2 will usually be caused by fuel entering the lubricating oil circuit due to a malfunction of the oil-heat exchanger mounted in the lubrication system. Accordingly, the voltage $U_2$ is the minimum voltage supplied by the sensor 1 and corresponds to the minimum oil level in the reservoir 2.

The increasing of the fluid level within the reservoir 2 will cause an increase in the voltages U and $U_1$, thereby increasing the difference between voltages $U_1$ and $U_2$. This difference is measured by the malfunction detector 7 and, when the difference exceeds a reference value $U_0$, the diode $D_2$ will enable the output signal of the amplifier $A_2$ to pass, thereby illuminating the visual indicator L. When the difference $U_1 - U_2$ is less than the reference voltage $U_0$, the diode $D_2$ is in a blocking condition and the visual indicator L is off. The reference voltage $U_0$ takes into account the normal parameter changes of the lubricating oil circuit over the entire light spectrum which will effect the level of the oil within the reservoir.

When the switch I is open and the capacitor $C_2$ is discharged, such as before starting the gas turbine engine, the application of electrical power to the sensor 1 causes diode $D_2$ to be conducting, thereby illuminating the visual indicator L. This allows the visual indicator L to be tested to ensure that it is in working order prior to engine starting. Upon the closing of switch I, the capacitor $C_2$ is charged to the value $+U$ and the visual indicator L is extinguished.

The foregoing description is provided for illustrative purposes only and should not be construed as in any way limiting this invention, the scope of which is defined solely by the appended claims.

I claim:

1. A detector for detecting the level of oil in an oil reservoir comprising:
   a) electrically actuated level sensing means operatively associated with the reservoir so as to sense the level of oil in the reservoir, the level sensing means having an electrical outlet terminal and means to supply a voltage U to the outlet terminal such that voltage U varies in direct proportion to the level of oil in the reservoir;
   b) first circuit means operatively connected to the outlet terminal and having a first outlet junction at which is applied a voltage $U_1$ which varies as voltage U varies;
   c) second circuit means operatively connected to the outlet terminal and having a second outlet junction at which is applied a voltage $U_2$ which decreases as voltage U decreases, but does not increase as voltage U increases;
   d) comparison circuit means operatively connected to the first and second outlet junctions so as to compare the difference between voltages $U_1$ and $U_2$ with a predetermined reference voltage $U_0$ and to supply an output signal when the voltage $U_1 - U_2$ exceeds the reference voltage $U_0$; and,
   e) indicator means operatively connected to the comparison circuit means so as to indicate the presence of the output signal.

2. The detector of claim 1 wherein the first circuit means comprises:
   a resistor $R_1$ and a capacitor $C_1$ connected in series between the outlet terminal and ground such that the first outlet junction is located between the resistor $R_1$ and the capacitor $C_1$.

3. The detector of claim 1 wherein the second circuit means comprises:
   a) a resistor $R_2$ a diode $D_1$ and a capacitor $C_2$ connected in series between the outlet terminal and ground such that the diode $D_1$ is located between the resistor $R_2$ and the capacitor $C_2$ and the second outlet junction is between the diode $D_1$ and the capacitor $C_2$; and,
   b) a resistor $R_3$ and a switch I connected in series between the outlet terminal and the second outlet junction.

4. The detector of claim 1 wherein the comparison circuit means comprises:
   a) a first amplifier $A_1$ with a gain of $-1$ having a negative input terminal connected to the first outlet junction and an output terminal;
   b) a second amplifier $A_2$ having a negative input terminal connected to the output terminal of the first amplifier, the second outlet junction and the reference voltage $U_0$, and having an output terminal; and,
   c) a diode $D_2$ operatively connected to the output terminal of the second amplifier and the indicator means.

5. The detector of claim 1 wherein the indicator means comprises a visual indicator.

6. The detector of claim 5 wherein the visual indicator comprises a light bulb L.

* * * * *